Figures 1, 2:
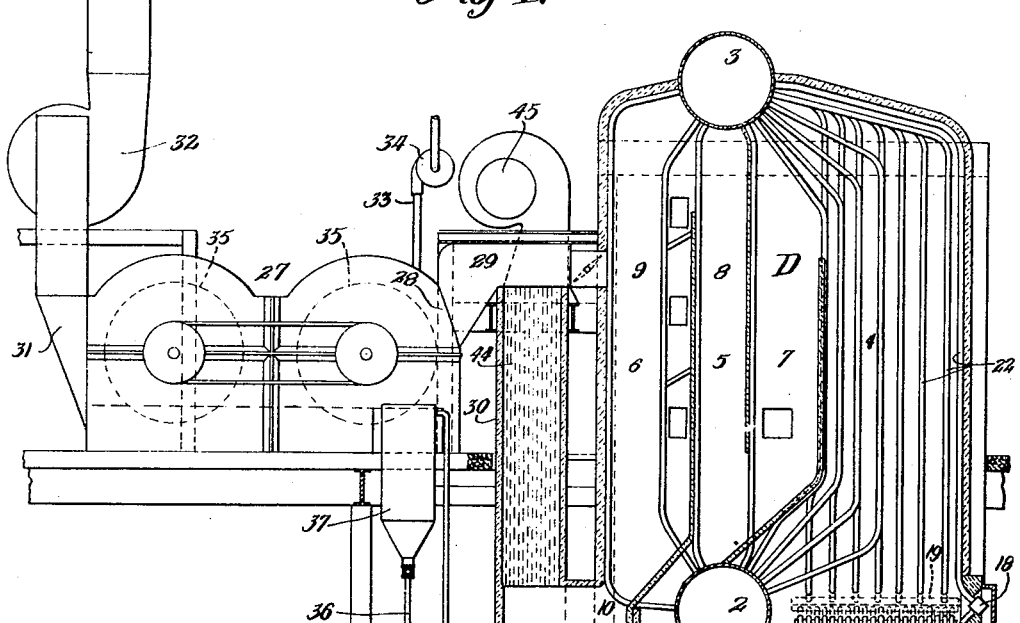

Aug. 27, 1940.  F. H. ROSENCRANTS ET AL  2,213,052
METHOD OF AND APPARATUS FOR THE RECOVERY
OF HEAT AND CHEMICALS FROM BLACK LIQUOR
Filed March 2, 1938

INVENTORS
Fay Harry Rosencrants
& Alex L. Hamm
BY
Symmestvedt & Lechner
ATTORNEYS Patented Aug. 27, 1940

2,213,052

UNITED STATES PATENT OFFICE 2,213,052

METHOD OF AND APPARATUS FOR THE RECOVERY OF HEAT AND CHEMICALS FROM BLACK LIQUOR

Fay Harry Rosencrants, Scarsdale, and Alexander Leopold Hamm, New York, N. Y., assignors to Combustion Engineering Company, Inc., New York, N. Y., a corporation of Delaware Application March 2, 1938, Serial No. 193,398

6 Claims. (Cl. 23—48)

This invention relates to a method of and apparatus for the recovery of heat and chemicals from black liquor obtained in the preparation of pulp from wood by the caustic soda or the sulphate process, in which the paper pulp is made by treating chips of wood with liquor containing reagents, such as sodium hydrate or sodium sulphide. After the action of the chemicals on the wood has been completed in a digester, the material is washed and the wash liquor, usually termed black liquor contains substances which should be recovered and availed of from the standpoint of economical operation. The black liquor contains carbonaceous matter, and chemicals such as sodium salts. For economical operation, the chemicals should be recovered and the carbonaceous substances availed of to produce heat. This has heretofore been accomplished in a combined waste heat boiler and chemical recovery furnace, generally in one of two different ways.

According to one method (that of the Wagner Patent No. 1,771,829) the black liquor has been sprayed in an upper part or zone of the furnace in which it is dried. From this upper zone, the dried particles gravitate into a distillation and combustion zone in which destructive distillation and combustion and conversion of chemicals occur in space. Ash and chemical deposit on the floor of the furnace. The operations of this process are thus essentially conducted in space.

According to another method (the so-called "Tomlinson method") the black liquor is sprayed on to the walls of the furnace by revolving nozzles. Very little drying and distillation is done in space. The drying is done on the walls, as is a substantial part of the distillation of volatile substances. The dried material on the walls falls off in chunks to the floor of the furnace, where it is burned and where the distillation of the remaining volatile substances and conversion and recovery of chemicals occurs.

Both processes are self-sustaining in operation, once the furnace has been started, the heat necessary being provided by the combustion of the solids and of the volatiles driven off.

It has been the usual practice in this art to first reduce the large percentages of water by passing the black liquor through multiple effect evaporators, operating with natural circulation, which produce liquor with a solid content of about 50% and not in excess of substantially 60%. This is the determinative factor upon which the aforesaid processes have been based.

According to our process we increase the solid content of the liquor to 65% of solids or higher before introducing it into the furnace, and this and other factors appearing hereinafter enables us, for all practical purposes, to dry the introduced liquor in space in the furnace with the dried solid content falling to a hearth where the distillation of the volatiles, the combustion of the solids, and the conversion and recovery of the chemicals occur.

This also enables us to operate with bare water wall tubes lining the combustion chamber (exclusive of the collecting chamber at the bottom) because by reducing the amount of water in the liquor as above described to provide a high density liquor, the amount of heat absorbed in evaporating moisture from the liquor is materially reduced, thus making it possible to maintain the desired temperature in such a furnace, and to effectively utilize the heat developed for the generation of steam, and to secure other advantages hereinafter appearing.

It is a further object of our invention to reduce the carry-over into the boiler passes and also to obtain a maximum recovery.

The foregoing, together with such other objects and advantages as may hereinafter appear or are incident to our invention are realized by means of a method and apparatus illustrated in preferred form in the accompanying drawing, wherein—

Figure 1 is a sectional elevational view of a recovery unit and associated devices constructed and arranged in accordance with our invention; and Figure 2 is a detailed view of one of the fuel nozzles employed.

The chemical and heat recovering unit comprises a furnace A having a bottom collecting chamber B providing a hearth C, and a waste heat boiler D associated with the furnace. As illustrated, the lower portion of the combustion chamber of the furnace tapers down to the reduced size of the collecting chamber B.

The boiler D in this instance comprises a lower drum 2, and upper drum 3, and banks of connecting boiler tubes 4, 5 and 6 of usual length, the front bank 4 of which is preferably at one side of the upper portion of the combustion chamber of the furnace. Baffles are associated with the banks of boiler tubes to provide a plurality of passes 7, 8 and 9 for leading the products of combustion over the tubes of the banks 5 and 6 through an outlet 10 to the gas chamber 11.

The walls of the lower portion of the combustion chamber of the furnace and of the collecting chamber B are lined with a plurality of upright closely spaced steam evaporating tubes 12, 13 and 14 connected respectively into lower headers 15, 16 and 17 at their lower ends. The front wall tubes 12 and the side wall tubes 14 connect at their upper ends into headers 18 and 19 respectively and the rear wall tubes 13 connect at their upper ends into the lower drum 2 of the boiler. While only one side wall is shown it is pointed out that both side walls are provided with steam evaporating tubes arranged as above described. The lower header 15 is connected to the lower header 16 by a plurality of tubes 20, and a plurality of downcomer tubes 21 are provided to supply water from a suitable point in the boiler to the lower headers 15 and 17. The upper headers 18 and 19 are connected to the steam and water drum 3 of the boiler by a plurality of upcomer tubes 22 located within the combustion chamber at the upper portion of walls thereof.

The upright steam evaporating tubes are preferably provided with fins as indicated at 23 to close the spaces therebetween and the portions of the tubes which line the collecting chamber B are covered with refractory material as indicated at 24. A refractory bottom 25 is also provided for the chamber B.

The furnace is provided with a plurality of nozzles 26 for introducing the black liquor which has been treated as will appear hereinafter. The furnace is relatively tall and the liquor is introduced well below the top of the furnace chamber, so that gases of combustion have a substantial upward travel in the furnace before entering the boiler. It is pointed out that the furnace is initially heated up by introducing fuel as by means of a suitable burner 48, after which it is self sustaining.

The black liquor as obtained from the pulp mill contains large percentages of water and the first step is to reduce the percentage of water by passing the liquor through multiple effect evaporators of well known form, operating with natural circulation, and producing liquor with density up to a high limiting value of solid content of approximately 60%. Above this density the viscosity of the liquor is such that forced circulation by a pump is required.

In our process we pump this liquor having from 45% to 60% solids into a dehydrating unit such as a cascade evaporator 27 in which we increase the solid content to 65% of solids or higher. The evaporator 27 has a gas inlet 28 which is connected by means of conduits 29 and 30 to the waste gas chamber 11 of the boiler. The hot gases are led from the evaporator to a stack as by means of a conduit 31 and exhaust fan 32.

The liquor is introduced into the evaporator by means of the pipe 33 and pump 34, and the heat of the flue gases, in the neighborhood of 450° to 550° F., evaporates water from the liquor. The flue gases are washed by means of revolving discs 35 which dip into the liquor and expose a film of liquor to the gases so that the discs not only evaporate water from the liquor but also wash the gases by the adhesion of entrained solid onto the wet discs. These washed out solids add to the concentration of the liquor and are returned to the recovery furnace with the concentrated liquor. This scrubbing of the gases prevents loss of chemicals to the atmosphere with the flue gases.

The concentrated liquor containing approximately 70% of solids and at a temperature of from 180° to 200° F. is led, by means of a pipe 36, from a chamber 37 of the evaporator to a pump 38 and from the pump to a steam heater 39 from which it is led by means of a pipe 40 to the nozzles 26 of the recovery unit. We prefer to introduce the liquor at a pressure of from 75 to 100 pounds and at a temperature of from 230° to 240° F. Excess liquor is returned to the chamber 37 by means of pipes 40a connected to the nozzles and return pipe 40b. As the liquor is introduced into the furnace, the reduction in pressure causes some of the water in the liquor to flash into steam.

In the recovery unit practically all of the remaining quantities of water are evaporated from the liquor in space and the solid content or black ash falls to the hearth C in almost dry state, where it accumulates in a bed. Preheated air is admitted into this bed as by means of inlets 42 in an amount sufficient to keep the bed incandescent and sufficient to maintain a reducing atmosphere in the bed.

In this bed evaporation of the small percentage of moisture contained in the black ash occurs, distillation of the volatiles and burning of the solid combustible materials take place, and the sodium sulphate is converted into sodium sulphide which may be withdrawn through a discharge spout 41.

Additional preheated air is admitted through the inlets 43 spaced above the inlets 42. This air causes the particles at the surface of the bed to burn and, therefore, the location of the inlets 43 determines the height to which the incandescent bed will build up.

The air is heated by a preheater 44 located in the gas conduit 30 of the boiler, through which it is passed by a fan 45 and from which it is led by a conduit 46 to the air chamber 47.

The hot burning gases rise from the bed in counter current to the falling black ash so that the ash is subjected to the drying effect thereof. As the flame and gas stream travels upwardly in the furnace chamber heat is absorbed by the wall tubes for the generation of steam and since the portion of the furnace chamber above the nozzles 26 is relatively tall, condensation of chemical carried in the gas stream occurs. The condensed particles tend to agglomerate into larger particles which gravitate to the floor for recovery. The carry-over of chemical into the boiler is thus minimized. Other substances in the gas stream are cooled which minimizes slag collection in the boiler tube nests.

It will be seen from the foregoing that through the practice of our invention we are enabled to fully line the furnace with bare water-cooled tubes to increase the life of the furnace because by raising the fuel density of the liquor entering the furnace, thereby lowering the amount of liquid to be evaporated, and by preheating the liquor and air for combustion and introducing the liquor under pressure whereby liquid will flash from the solids we provide the necessary heat input into the furnace to assure combustion at the desired temperature and the furnace is self sustaining.

In prior methods, since the liquor has a fuel density of from 50% to 60% of solids, it has been the practice to employ full refractory furnaces, or refractory protected water tubes at the walls of the furnace in order to obtain sufficient heat to evaporate the moisture out of the introduced liquor without lowering the furnace temperature to an objectionable point. Such refractory walled or lined furnaces are very expensive to maintain, are not economical to operate, and have a high carry-over small globules of liquor, and valuable sodium salts in divided form. This leads to operating difficulties in the waste heat boiler because when these carried-over substances strike the colder surfaces of the boiler they cause considerable slagging and closing off of the boiler passes.

By our invention we can use a substantially fully water-cooled furnace because we utilize high density heated black liquor introduced into the lower part of the boiler furnace and preheated air. This ensures a sufficiently high temperature in such lower part. The temperature in the part thereabove gradually decreases, resulting in reduction of carry-over.

To this end we provide a combustion chamber of such height that the distance from the point of fuel admission to the top of the chamber where the gases enter the first boiler pass 7 is sufficient, together with the cooling surfaces provided at the walls, to ensure of condensible volatiles in the gases being condensed before they turn to enter the boiler passes.

The riser tubes 22 at the side and front walls of the upper portion of the chamber and the bank 4 of spaced parallel boiler tubes at the rear wall exert a material cooling influence in the upper portion of the combustion chamber so that the temperature and volume and consequently the velocity of the gases are reduced. Any particles in flotation in the gases entering the boiler passes are cooled and, therefore, will not adhere as slag to the boiler tubes, it being noted, however, that such particles have been minimized because the condensed particles tend to agglomerate and fall down for retreatment in the lower portion of the furnace.

By way of illustration the proportion of an installation may be gathered from the fact that in the installation shown in the drawing the width of the furnace is 20 feet; the depth of the hearth portion from front to back is 5 feet and the height 7 feet; and the depth of the main furnace chamber is 9 feet from front to back and the height to approximately the level of the lower drum 2 is 23 feet which is also approximately the height of the boiler. As to temperatures, these would approximate a maximum of 2400° F. at the hearth, 2200° F. at the level of the fuel nozzles, 1400° F. at the upper portion where the gases enter the boiler pass 7, and 450° to 550° F. in the evaporator 27 as above mentioned. The velocity of the gases where they leave the main furnace chamber is approximately 15 feet per second.

In Figure 2 we have illustrated one of the fuel nozzles 26 which may be adjustable to control the spray. For example, by swinging the nozzle to the dot-and-dash line position 26a the liquor is discharged upwardly into the furnace so that the solid residues follow a definite trajectory upward and thence downward onto a certain portion of the hearth. By varying the adjustment the deposit of the ash on the hearth and the distribution thereof over the hearth may be controlled and an even fuel bed maintained. Also the adjustment makes it possible to ensure that the solid particles lodge on the bed in the state of desired dryness.

We claim:

1. The self-sustaining method of recovering chemicals from black liquor which comprises increasing the solid content of the liquor substantially above a customary high value of 60% of solids, preheating said concentrated liquor to at least substantially 230° F., thereby maintaining said liquor fluid and also raising the temperature of the solids thereof, feeding said preheated liquor to spray nozzles at a pressure of at least substantially 75 pounds thereby preventing substantial evaporation of moisture in the black liquor during feed, spraying said liquor into a furnace having its walls substantially completely defined by bare steam generating tubes to form a substantially all metal furnace, without impingement of substantial quantities of liquor spray on said walls, and with a reduction of pressure at the discharge of the spray to cause water in the liquor to flash into steam with consequent increase of solid content of the liquor spray, allowing the spray particles of increased solid content to gravitate in space through a distance such that remaining quantities of water are evaporated therefrom while gravitating in space in said furnace to produce substantially dry black ash particles, collecting the said dried gravitating black ash particles in a bed at the bottom of the furnace, introducing preheated air into said bed in an amount to maintain a reducing atmosphere and burn the solids to distill the volatiles and to convert the chemical, introducing additional preheated air directly above the surface of said bed, utilizing the heat from the burning solids and the combustion of the volatiles to effect the drying and to generate steam, and discharging the converted chemicals.

2. The self-sustaining method of recovering chemicals from black liquor which comprises increasing the solid content of the liquor substantially above a customary high value of 60% of solids, preheating said concentrated liquor to at least substantially 230° F., thereby maintaining said liquor fluid and also raising the temperature of the solids thereof, feeding said preheated liquor to spray nozzles at a pressure of at least substantially 75 pounds thereby preventing substantial evaporation of moisture in the black liquor during feed, spraying said liquor into a furnace having a bottom smelting section and a dehydrating and combustion section thereabove with walls substantially completely defined by bare steam generating tubes to form a substantially all metal furnace section, said liquor being sprayed into said dehydrating and combustion section without impingement of substantial quantities of liquor spray on said walls, and with a reduction of pressure at the discharge of the spray to cause water in the liquor to flash into steam with consequent increase of solid content of the liquor spray, allowing the particles of increased solid content to gravitate in space through a distance such that remaining quantities of water are evaporated from said liquor spray while gravitating in space in said dehydrating and combustion section to produce dry black ash particles, collecting the said gravitating black ash particles in a bed in said smelting section, introducing preheated air into said bed in an amount to maintain a reducing atmosphere and burn the solids to distill the volatiles and to convert the chemical, introducing additional preheated air directly above the surface of said bed to maintain a given level of said bed, utilizing the heat from the burning solids and the combustion of the volatiles to effect the drying and to generate steam, and discharging the converted chemicals.

3. In self-sustaining apparatus for recovering chemicals from black liquor, the combination of evaporator means for raising the fuel density of black liquor to a density substantially above the normal density of such liquor, means for preheating said high density liquor, a vertical single pass tower-like chamber having a bottom smelting section, an intermediate dehydrating and combustion section, and an upper gas and final combustion section, said intermediate section having its walls lined with closely spaced bare steam generating tubes to form a substantially all metal furnace section, nozzle means located in said intermediate section for spraying said preheated high density liquor into said chamber at said intermediate section in space therein and without substantial impingement on the walls, means for feeding said preheated liquor to said nozzle means under pressure sufficient to cause substantial evaporation at the nozzle means, said nozzle means being located at a level effecting drying of said liquor spray in space while gravitating and before the dried solid content thereof falls into said smelting section to form a fuel bed, means for admitting preheated air to said fuel bed in amounts to maintain a reducing atmosphere therein, and means for introducing additional air for combustion directly above the fuel bed.

4. In self-sustaining apparatus for recovering chemicals from black liquor, the combination of evaporator means for raising the fuel density of black liquor to a density substantially above the normal density of such liquor, means for preheating said high density liquor, a vertical single pass tower-like chamber having a bottom smelting section, an intermediate dehydrating and combustion section, and an upper gas and final combustion section, said intermediate section having its walls lined with closely spaced bare steam generating tubes having extended fins to form a substantially all metal furnace section, nozzle means located in said intermediate section for spraying said preheated high density liquor into said chamber at said intermediate section in space therein and without substantial impingement on the walls, means for feeding said preheated liquor to said nozzle means under pressure sufficient to cause substantial evaporation at the nozzle means, said nozzle means being located at a level effecting drying of said liquor spray in space while gravitating and before the dried solid content thereof falls into said smelting section to form a fuel bed, means for admitting preheated air to said fuel bed in amounts to maintain a reducing atmosphere therein, and means for introducing additional air for combustion directly above the fuel bed.

5. In self-sustaining apparatus for recovering chemicals from black liquor, the combination of means for concentrating said black liquor to a value above a customary high value of 60% of solids, means for preheating said concentrated liquor to at least substantially 230° F., a vertical single pass tower-like chamber having a bottom smelting section, an intermediate dehydrating and combustion section, and an upper gas and final combustion section, said intermediate section having its walls lined with closely spaced bare steam generating tubes to form a substantially all metal furnace section, nozzle means located in said intermediate section for spraying said preheated high density liquor into said chamber at said intermediate section in space therein and without substantial impingement on the walls, means for pumping said preheated liquor to said nozzle means at a pressure of at least substantially 75 pounds, whereby substantial evaporation takes place at the nozzle means, said nozzle means being located at a level effecting drying of said liquor spray in space while gravitating and before the dried solid content thereof falls into said smelting section to form a fuel bed, means for admitting preheated air to said fuel bed in amounts to maintain a reducing atmosphere therein, and means for introducing additional air for combustion directly above the fuel bed.

6. In self-sustaining apparatus for recovering chemicals from black liquor, the combination of evaporator means for raising the fuel density of black liquor to a density substantially above the normal density of such liquor, means for preheating said high density liquor, a vertical single pass tower-like chamber having a bottom smelting section, an intermediate dehydrating and combustion section, and an upper gas and final combustion section, said intermediate section having its walls lined with closely spaced bare steam generating tubes to form a substantially all metal furnace section, nozzle means located in said intermediate section for spraying said preheated high density liquor into said chamber at said intermediate section in space therein and without substantial impingement on the walls, means for feeding said preheated liquor to said nozzle means under pressure sufficient to cause substantial evaporation at the nozzle means, said nozzle means being located at a level effecting drying of said liquor spray in space while gravitating and before the dried solid content thereof falls into said smelting section to form a fuel bed, means for admitting preheated air to said fuel bed in amounts to maintain a reducing atmosphere therein, means for introducing additional air for combustion directly above the fuel bed, and exposed steam generating tubes bounding said upper gas and final combustion section.

FAY HARRY ROSENCRANTS.
ALEX. L. HAMM.